United States Patent
Boulos et al.

(10) Patent No.: US 9,605,873 B2
(45) Date of Patent: Mar. 28, 2017

(54) HEATER WITH ENERGY-SAVING OPERATIONS AND METHOD RELATED THERETO

(71) Applicant: Kaz USA, Inc., Southborough, MA (US)

(72) Inventors: Charles Boulos, Milford, MA (US); Charles F. Squires, Waltham, MA (US)

(73) Assignee: Helen of Troy Limited, St. Michael (BB)

(*) Notice: Subject to any disclaimer, the term of this patent is extended or adjusted under 35 U.S.C. 154(b) by 478 days.

(21) Appl. No.: 14/027,900

(22) Filed: Sep. 16, 2013

(65) Prior Publication Data

US 2014/0076884 A1    Mar. 20, 2014

Related U.S. Application Data

(60) Provisional application No. 61/701,444, filed on Sep. 14, 2012, provisional application No. 61/792,079, filed on Mar. 15, 2013.

(51) Int. Cl.
| | | |
|---|---|---|
| H05B 1/02 | (2006.01) | |
| F24H 9/20 | (2006.01) | |
| G05D 23/19 | (2006.01) | |

(52) U.S. Cl.
CPC ....... F24H 9/2071 (2013.01); G05D 23/1919 (2013.01)

(58) Field of Classification Search
CPC  F24H 9/2071; G05D 23/1919; H05B 1/0275; H05B 1/02
USPC ............ 219/494, 492, 497, 507, 483–486, 219/412–414
See application file for complete search history.

(56) References Cited

U.S. PATENT DOCUMENTS

| | | | | |
|---|---|---|---|---|
| 4,410,795 A | * | 10/1983 | Ueda ............... | G05D 23/1917 219/492 |
| 7,049,553 B2 | * | 5/2006 | Shigetomi ......... | H01L 21/67103 118/724 |
| 8,331,819 B2 | * | 12/2012 | Fukuzawa .......... | G03G 15/2039 399/69 |
| 2003/0062362 A1 | * | 4/2003 | Tateishi ............. | F24H 9/2071 219/508 |

(Continued)

FOREIGN PATENT DOCUMENTS

WO    2009/012269    1/2009

OTHER PUBLICATIONS

PCT International Search Report and Written Opinion from PCT/IB2013/002767, mailed on Mar. 19, 2014.

(Continued)

*Primary Examiner* — Mark Paschall
(74) *Attorney, Agent, or Firm* — Stroock & Stroock & Lavan LLP

(57) ABSTRACT

A heater includes a heating unit that supports at least a high-power state, a low-power state and a stand-by state. A control circuitry of the heater implements a state machine to control the heating unit, with respective states in the state machine corresponding to power states in the heating unit. The transition from a first state to a second state in the state machine is determined by a comparison between a measured ambient temperature with a predetermined threshold temperature for transitioning from the first state to the second state.

21 Claims, 4 Drawing Sheets

(56) References Cited

U.S. PATENT DOCUMENTS

| | | | |
|---|---|---|---|
| 2004/0086927 A1* | 5/2004 | Atwood | B01L 3/50851 |
| | | | 435/6.18 |
| 2005/0016988 A1 | 1/2005 | Harwell et al. | |
| 2005/0127064 A1 | 6/2005 | Garcia et al. | |
| 2006/0161306 A1 | 7/2006 | Federspiel | |
| 2006/0213901 A1 | 9/2006 | Wilkins et al. | |
| 2008/0179409 A1 | 7/2008 | Seem | |
| 2009/0020618 A1 | 1/2009 | Gutierrez et al. | |

OTHER PUBLICATIONS

Office Action issued on Oct. 24, 2016 in Taiwanese Patent Application No. 102133351.

\* cited by examiner

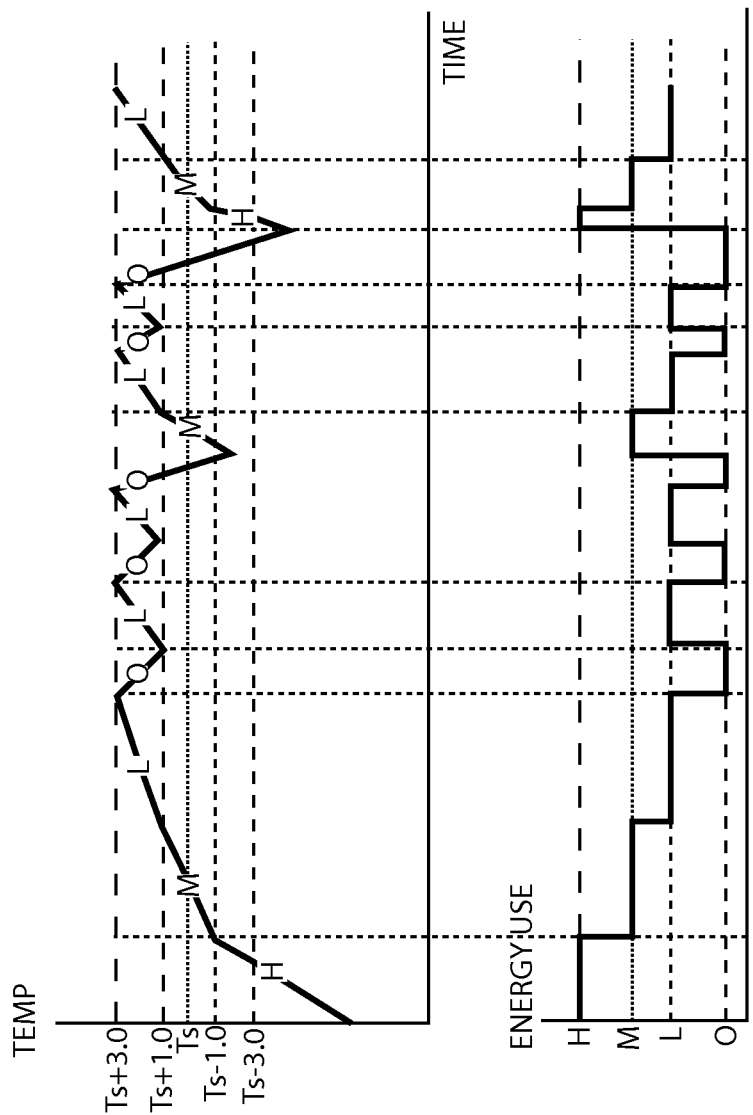

HEATER WITH ENERGY-SAVING OPERATIONS AND METHOD RELATED THERETO

CROSS-REFERENCE TO RELATED APPLICATIONS

This application claims priority to U.S. Provisional Application No. 61/701,444, filed Sep. 14, 2012, and U.S. Provisional Application No. 61/792,079, filed on Mar. 15, 2013, the disclosure of each of which is incorporated by reference herein in its entirety.

BACKGROUND OF THE INVENTION

1. Field of the Invention

The present invention generally relates to heaters. More particularly, the present invention discloses a heater that supports a plurality of modes of operation to conserve energy while heating a room.

2. Description of the Related Art

Thermostats for heaters are well known. They permit a user to select a desired temperature range for a room and then keep the temperature within that range by selectively turning on and turning off a heating unit. This mode of operation is inefficient, however, as it tends to drive the heating unit at full power until the temperature of the room reaches or exceeds the upper threshold temperature.

It is therefore desirable to provide a more energy-efficient heater and methods related thereto.

SUMMARY OF THE INVENTION

In accordance with one aspect of the present invention, a heater is provided. The heater includes a heating unit for generating thermal energy and supporting at least a first power state in which the heater operates at a first power level, a second power state in which the heater operates at a second power level that is lower than the first power level, and a third power state in which the heater operates at a third power level that is lower than the second power level. The heating unit is configured to enter the first, second and third power states according to a control signal. The heater further includes a temperature sensor for measuring an ambient temperature and generating a corresponding temperature signal, and control circuitry for generating the control signal according to at least the temperature signal. The control circuitry is configured to support a finite state machine having at least a first control state, a second control state and a third control state, transitions between the control states determined according to at least the temperature signal and one or more user-selectable temperatures. When in the first control state or transitioning to the first control state the control circuitry generates the control signal to cause the heating unit to enter into the first power state, when in the second control state or transitioning to the second control state the control circuitry generates the control signal to cause the heating unit to enter into the second power state, and when in the third control state or transitioning to the third control state the control circuitry generates the control signal to cause the heating unit to enter into the third power state. In some embodiments, the third power state is a stand-by state.

In some embodiments, the finite state machine of the heater is configured to: (a) transition from the first control state to the second control state when a temperature indicated by the temperature signal is above a predetermined threshold temperature for transitioning from the first control state to the second control state; (b) transition from the second control state to the first control state when a temperature indicated by the temperature signal is below a predetermined threshold temperature for transitioning from the second control state to the first control state; (c) transition from the second control state to the third control state when a temperature indicated by the temperature signal is above a predetermined threshold temperature for transitioning from the second control state to the third control state; and (d) transition from the third control state to the second control state when a temperature indicated by the temperature signal is below a predetermined threshold temperature for transitioning from the third control state to the second control state. In certain embodiments, the control circuitry of the heater further includes a memory for storing one or more the predetermined threshold temperatures.

The heater can further include a user interface configured to enable a user to enter one or more threshold temperatures for the transitions between the different control states. The user interface can also be configured to enable a user to enter a set temperature. This entered set temperature can be used in combination with one or more differential temperatures provided by the user or automatically generated by the control circuitry to obtain the various threshold temperatures for the transitions between the different control states.

In further embodiments, the heater further supports a fourth power state in which the heater operates at a fourth power level that is lower than the third power level. In such embodiments, the finite state machine is further configured to transition from the third control state to the fourth control state when a temperature indicated by the temperature signal is above a predetermined threshold temperature for transitioning from the third control state to the fourth control state, and to transition from the fourth control state to the third control state when a temperature indicated by the temperature signal is below a predetermined threshold temperature for transitioning from the fourth control state to the third control state. The fourth power state in such embodiments can be a stand-by state.

In accordance with another aspect of the present invention, a method for controlling a heating unit of a heater as described above is provided. The methods includes: (a) causing the heating unit to enter into the first power state from the second power state when an ambient temperature is below a predetermined threshold temperature for transitioning from the second power state to the first power state; (b) causing the heating unit to enter into the second power state from the first power state when the ambient temperature is above the predetermined threshold temperature for transitioning from the first power state to the second power state; (c) causing the heating unit to enter into the second power state from the third power state when the ambient temperature is below a predetermined threshold temperature for transitioning from the third power state to the second power state; and (d) causing the heating unit to enter into the third power state from the second power state when the ambient temperature is above the predetermined threshold temperature for transitioning from the second power state to the third power state.

In some embodiments of such a method, where the heating unit further supports a fourth power state in which the heater operates at a fourth power level that is lower than the third power level, the method further includes (e) causing the heating unit to enter into the fourth power state from the third power state when the ambient temperature is above the predetermined threshold temperature for transitioning from the third power state to the fourth power state, and (f) causing the heating unit to enter into the third power state from the fourth power state when the ambient temperature is below the predetermined threshold temperature for transitioning from the fourth power state to the third power state.

In a further aspect, the present invention provides a heater that includes a heating unit for generating thermal energy. The heating unit supports at least a first power state in which the heater operates at a first power level, a second power state in which the heater operates at a second power level that is lower than the first power level, and a third power state in which the heater operates at a third power level that is lower than the second power level, the heating unit configured to enter the first, second and third power states according to a control signal. The heater further includes a temperature sensor for measuring an ambient temperature and generating a corresponding temperature signal, and control circuitry for generating the control signal according to at least the temperature signal and one or more user-selectable temperatures, the control circuitry including a central processing unit communicatively coupled to a memory, the memory storing program code executable by the central processing unit to perform the method of: (a) generating the control signal to cause the heating unit to enter into the first power state from the second power state when an ambient temperature is below a predetermined threshold temperature for transitioning from the second power state to the first power state; (b) generating the control signal to cause the heating unit to enter into the second power state from the first power state when the ambient temperature is above the predetermined threshold temperature for transitioning from the first power state to the second power state; (c) generating the control signal to cause the heating unit to enter into the second power state from the third power state when the ambient temperature is below a predetermined threshold temperature for transitioning from the third power state to the second power state; and (d) generating the control signal to cause the heating unit to enter into the third power state from the second power state when the ambient temperature is above the predetermined threshold temperature for transitioning from the second power state to the third power state.

An additional aspect of the present invention provides a control circuit for a heating unit that includes mode control circuitry for generating a power control signal to control the heating unit according to one or more user-selectable temperatures and a temperature signal received from a thermometer measuring ambient temperature, the mode control circuitry including a central processing unit communicatively coupled to a memory, the memory storing program code executable by the central processing unit to perform the method of: (a) generating the power control signal to cause the heating unit to enter into a low-power state from a high-power state when the ambient temperature indicated by the temperature signal is above a predetermined threshold temperature for transitioning from the high-power state to the low-power state; (b) generating the power control signal to cause the heating unit to enter into the high-power state from the low-power state when the ambient temperature indicated by the temperature signal is below a predetermined threshold temperature for transitioning from the low-power state to the high-power state; (c) generating the power control signal to cause the heating unit to enter into a stand-by state from the low-power state when the ambient temperature indicated by the temperature signal is above a predetermined threshold temperature for transitioning from the low-power state to the stand-by state; and (d) generating the power control signal to cause the heating unit to enter into the low-power state from the stand-by state when the ambient temperature indicated by the temperature signal is below a predetermined threshold temperature for transitioning from the stand-by state to the low-power state.

Yet a further aspect of the present invention provides a control device for a heating unit supporting at least a first power state in which the heater operates at a first power level, a second power state in which the heater operates at a second power level that is lower than the first power level, and a third power state in which the heater operates at a third power level that is lower than the second power level, the heating unit configured to enter the first, second and third power states according to a control signal. The control device includes control circuitry for generating the control signal according to at least the temperature signal, the control circuitry configured to support a finite state machine having at least a first control state, a second control state and a third control state, transitions between the control states determined according to at least the temperature signal and one or more user-selectable temperatures. When in the first control state or transitioning to the first control state the control circuitry generates the control signal to cause the heating unit to enter into the first power state, when in the second control state or transitioning to the second control state the control circuitry generates the control signal to cause the heating unit to enter into the second power state, and when in the third control state or transitioning to the third control state the control circuitry generates the control signal to cause the heating unit to enter into the third power state.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings:

FIG. 4a is a plot of an example ambient temperature profile during a period of time of heating by a heater according to an embodiment depicted in FIG. 3; and FIG. 4b is a plot of an example heating level profile corresponding to the ambient temperature profile during a period of time of heating by a heater as shown in FIG. 4a.

DETAILED DESCRIPTION

Figure 1:
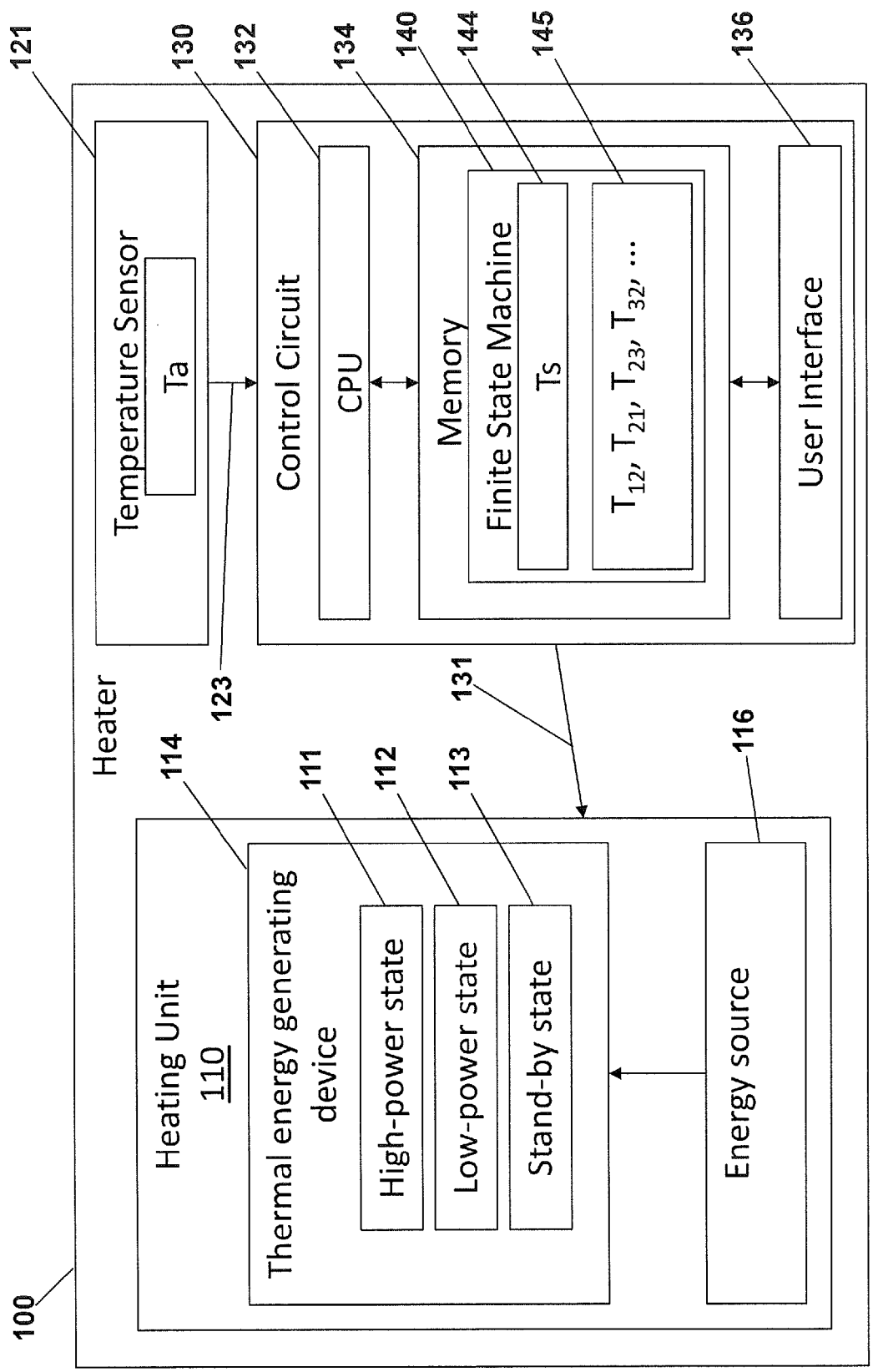
FIG. 1 is a block diagram of a heater according to an embodiment of the present invention.

An embodiment heater 100 is illustrated in FIG. 1. The heater 100 includes a heating unit 110, a temperature sensor 121 and control circuitry 130. The heating unit 110 generates thermal energy that is radiated, or otherwise transferred into the ambient environment, such as a room, so as to heat the environment. The heating unit 110 is capable of supporting various power states according to one or more control signals 131 received from the control circuitry 130. Any suitable heating unit 110 as known in the art may be used. The power states include a high-power state 111, in which the heating unit 110 outputs energy at a high-power level, such as, by way of example, 1500 Watts of thermal energy. The heating unit 110 also supports a low-power state 112, in which the heating unit 110 operates at a power level lower than that when in the high-power state 111, such as 60% of the power level of the high-power state 111 or lower. For example, while in the low-power state 112, the heating unit 110 may operate at a power level of 900 Watts. The heating unit 110 is also capable of entering into a stand-by state 113 in which it generates substantially little or no thermal energy for heating purposes, such as 5% or less of the thermal output of the high-power state 111. The heating unit 110 is capable of being controlled by the control circuitry 130 using known techniques.

Figure 2:
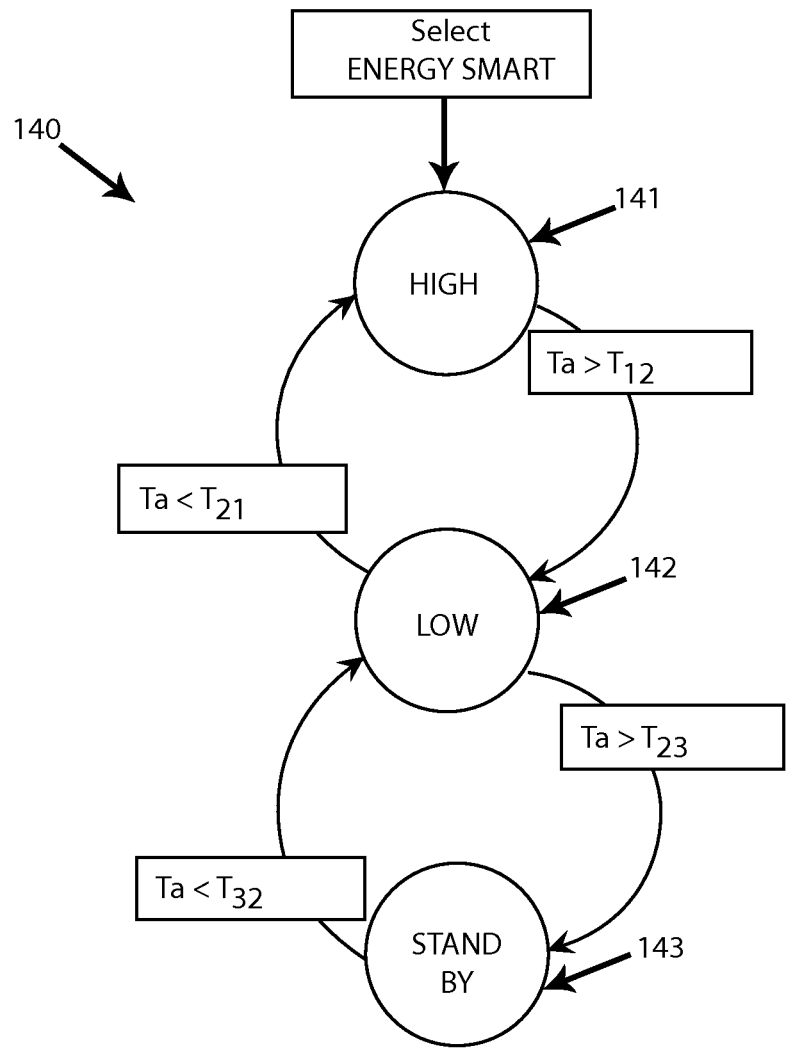
FIG. 2 is a flow chart of a heating method of a heater according to an embodiment of the present invention.

The heater can support additional power states and corresponding control states, such as an intermediate power state (being in such intermediate power state causes the heater to operate at an intermediate power level between the high-power state and the low-power state), or a higher-power state (being in such higher-power state causes the heater to operate at a power level greater than the high power level), and so on. A heater having three power states and three corresponding control states as depicted in FIG. 1 and FIG. 2 are described below to illustrate the operating principles of a heater according to the present invention, and it is understood that generally heaters having N (N≥3) power states (and N corresponding control states) operate in a similar manner as described herein.

Any suitable thermal energy generating device or devices 114 may be used for the heating unit 110 so as to heat the ambient environment. Examples include electric heating elements (metal, ceramic and the like), gas burners, kerosene burners, etc. These thermal energy generating devices 114 may directly heat air in the environment, such as with electric heating elements, or indirectly heat the environment via an intermediate material that is directly heated by the thermal energy generating device, such as water, oil, or the like, that in turn passes through a radiator. Further, it will be appreciated that the heating unit 110 includes an energy source 116 that is capable of providing the needed energy to the thermal energy generating device 114, such as an electrical power source, a fuel reservoir or the like, with related subcomponents, as known in the art.

The control circuit 130 implements a finite state machine 140 to generate the control signals 131 that cause the heating unit 110 to selectively enter into the high-power state 111, low-power state 112 or stand-by state 113. The control circuitry 130, and more specifically the finite state machine 140, generates the control signals 131 based upon an ambient temperature signal 123 generated by the temperature sensor 121. The temperature sensor 121 is configured to measure the ambient temperature of the environment that the heater 100 is heating and to generate a corresponding temperature signal 123. That is, the temperature signal 123 indicates the ambient temperature (hereinafter "Ta"). Any suitable temperature sensor 121 may be used to measure Ta 121 and generate the corresponding temperature signal 123, and the control circuitry 130 can be configured to receive the temperature signal 123 and act upon the temperature signal 123, as set forth in more detail below, to generate the control signals 131. The temperature signal 123 can be obtained on a continuous basis or sampled at a predetermined frequency, for example, every 1 second, every 5 seconds, or any other time intervals as desired. Similarly, the control signals 131 can also be generated continuously, or discretely at a predetermined frequency, which can be designed to correlate or otherwise depend on the sampling rates of the temperature signal 123.

Any suitable device may be used to implement the finite state machine 140, including by way of example digital electronics, analog electronics or a combination thereof, implemented using known techniques in accordance with the disclosure herein. As illustrated in FIG. 1, in one embodiment the control circuit 130 includes at least one central processing unit ("CPU") 132 that is communicatively connected to memory 134. The memory 134 hold both data and program code. The program code is executable by the CPU 132, and when executed causes the CPU 132 to perform steps that implement the finite state machine 140 and provide the control and operation of the heater 100. Hence, in FIG. 1, element 140 indicates both the program code and related data configured to implement a finite state machine as described herein.

With further reference to FIG. 2, the finite state machine 140 implements a first control state 141, a second control state 142 and a third control state 143. When in the first control state 141, which can be the initial state of the heater 100 when first turned on or when the heater 100 is placed into an energy-saving mode, the finite state machine 140 outputs a control signal 131 that causes the heating unit 110 to enter into the high-power state 111 so as to operate at a first power level to radiate or otherwise transfer heat into the ambient environment (such as 1500 Watts of power). When in the second control state 142, the finite state machine 140 outputs a control signal 131 that causes the heating unit 110 to enter into the low-power state 112 so as to operate at a second, intermediate power level to radiate or otherwise transfer heat into the ambient environment (such as 900 Watts of power). Finally, when in the third control state 143, the finite state machine 140 outputs a control signal 131 that causes the heating unit 110 to enter into the stand-by state 113 in which the heating unit 110 operates at a third power level that generates little or no thermal energy (i.e., effectively close to or zero Watts of power).

Transitions between the various control states 141, 142, 143 can be governed by the temperature signal 123, a preset or user-selectable set temperature 144 (hereinafter "Ts"), and a number of predetermined transition threshold temperatures, the comparisons of which with Ts are used as conditions to determine the transitions between different control states. For example, a heater having three control states can include four transition threshold temperatures: $T_{12}$, $T_{21}$, $T_{23}$, and $T_{32}$. The generation and use of these transition threshold temperatures are further illustrated in FIG. 2 and described below.

The control circuitry 130 includes one or more memory devices for storing the respective values of Ts 144 and the various transition threshold temperatures 145. These values 144 and 145 may be stored in digital or analog form, depending upon the implementation used for the finite state machine 140, using any suitable equipment, such as flash memory, random access memory, registers, potentiometers, or the like. The memory may be permanent, or volatile, and may be read-only or both readable and writable, although preferably the memory associated with Ts 144 is both writable and non-volatile. For example, in the specific embodiment shown in FIG. 1, the memory 134 may be static or dynamic random access memory, flash memory or the like.

The control circuitry 130 further includes a user interface 136. The user interface 136 can be configured to enable a user to enter or select the temperature value for Ts 144. Alternatively or additionally, the user interface 136 can also be configured to enable the user to enter or select one or more transition threshold temperatures 145. The user-selected temperature values can then be stored in the corresponding memory device or devices for Ts 144 and one or more transition threshold temperatures 145. As another alternative, the user interface can be configured to enable the user to enter one or more differential temperatures relative to the set temperature Ts 144, each for use in conjunction with Ts 144 to determine a transition from one control state to another control state. In such a case, the corresponding transition threshold temperatures can be obtained by adding the set temperature Ts 144 and the respective differential temperatures. Alternatively, the control circuitry can be configured to automatically compute the transition threshold temperatures based on the user-selected value for Ts 144 and a set of differential temperatures previously loaded or dynamically generated by the control circuitry (i.e., not provided by the user). Any suitable device or devices may be used in the user interface 136 to permit the user to enter temperature values, including the use of rotary knobs, sliders, keypads or the like; the CPU 132 is programmed to obtain information from, and optionally provide data to, the user interface 136 to interact with the user.

FIG. 2 illustrates the conditions for the various transitions among the different control states of the finite state machine 140. When in the first state 141, or when transitioning into the first state 141, the finite state machine 140 outputs a control signal 131 that causes the heating unit 110 to enter the high-power state 111, which heats the environment and causes Ta to rise. When Ta, as indicated by temperature signal 123, is greater than the transition threshold $T_{12}$, the finite state machine 140 transitions into the second state 142.

When in the second state 142, or when transitioning into the second state 142, the finite state machine 140 outputs a control signal 131 that causes the heating unit 110 to enter the low-power state 112, which heats the environment at an intermediate power level and can cause Ta to continue to rise. When Ta, as indicated by temperature signal 123, becomes greater than the transition threshold $T_{23}$, the finite state machine 140 transitions into the third state 143. On the other hand, when Ta, as indicated by temperature signal 123, drops below the transition threshold $T_{21}$ (e.g., due to disturbances in the environment that cause the ambient temperature to drop), then the finite state machine 140 transitions back into the first state 141.

When in the third state 143, or when transitioning into the third state 143, the finite state machine 140 outputs a control signal 131 that causes the heating unit 110 to enter the stand-by state 113 for no effective heating of the environment. When Ta, as indicated by temperature signal 123, drops below the transition threshold $T_{32}$, the finite state machine 140 transitions into the second state 142.

As noted above, Ts can be selected by a user for controlling the heater 100 to heat and maintain a desired ambient temperature Ta while operating in an energy-efficient manner. Ts can be selected as a reference temperature relative to a target temperature, or a target temperature for which Ta is to be reached and maintained. The transition threshold temperature for a transition from one control state to another control state can be set or selected to depend on the desired manner in which the heater is to be controlled, including the heating speed, transition response sensitivity and energy efficiency of the heater. The following Table 1 provides three exemplary sets of transition threshold temperatures and Ts for a three-state heater according to one embodiment of the present invention.

TABLE 1

Exemplary values for Ts and transition threshold temperatures* for a three-state heater according to one embodiment of the present invention

|  | Example 1 | Example 1a | Example 2 |
|---|---|---|---|
| Ts | 70° F. | 70° F. | 70° F. |
| $T_{12}$ | 69.5° F. (=Ts − 0.5° F.) | 68.5° F. (=Ts − 1.5° F.) | 70° F. (=Ts) |
| $T_{21}$ | 67.5° F. (=Ts − 2.5° F.) | 67.5° F. (=Ts − 2.5° F.) | 67.5° F. (=Ts − 2.5° F.) |
| $T_{23}$ | 70.5° F. (=Ts + 0.5° F.) | 70° F. (=Ts) | 72.5° F. (=Ts + 2.5° F.) |
| $T_{32}$ | 69.5° F. (=Ts − 0.5° F.) | 68.5° F. (=Ts − 1.5° F.) | 70° F. (=Ts) |

*The corresponding differential temperatures ΔT for each transition are provided in the parentheses following the respective transition threshold temperatures in the format of Ts + ΔT. For example, for $T_{12}$, ΔT is −0.5° F.

For a three-state heater as described herein, by appropriate selection of temperature values, the heater 100 can be controlled so as to keep the ambient temperature of an environment Ta within a temperature range from $T_{21}$ and $T_{23}$. Further, due to the design of the finite state machine 140, the heating unit 110 tends to operate in the low-power state 112, which extends from $T_{21}$ and $T_{23}$, thereby saving energy. By way of example and with reference to the Ts and the transition threshold temperature values provided in Example 2 of Table 1, and assuming that Ts 144 is selected by the user to be 70° F., the control circuitry 140 would operate the heating unit 110 so as to keep the ambient temperature of the environment within a temperature range extending from 67.5° F. to 72.5° F. More specifically, the heater 100 will only enter the high-power operating state 111 when the ambient temperature drops below 67.5° F., and exits the high-power operating state 111 when the ambient temperature exceeds the set temperature Ts 144 of 70° F. The heater 100 remains in the low-power operating state 112 when the ambient temperature is within the range of 67.5° F. to 72.5° F., and transitions to the stand-by operating state 113 when the ambient temperature exceeds 72.5° F. However, the heater 100 transitions out of the stand-by operating state 113 back into the low-power operating state 112 when the ambient temperature drops below 70° F.

Figure 3:
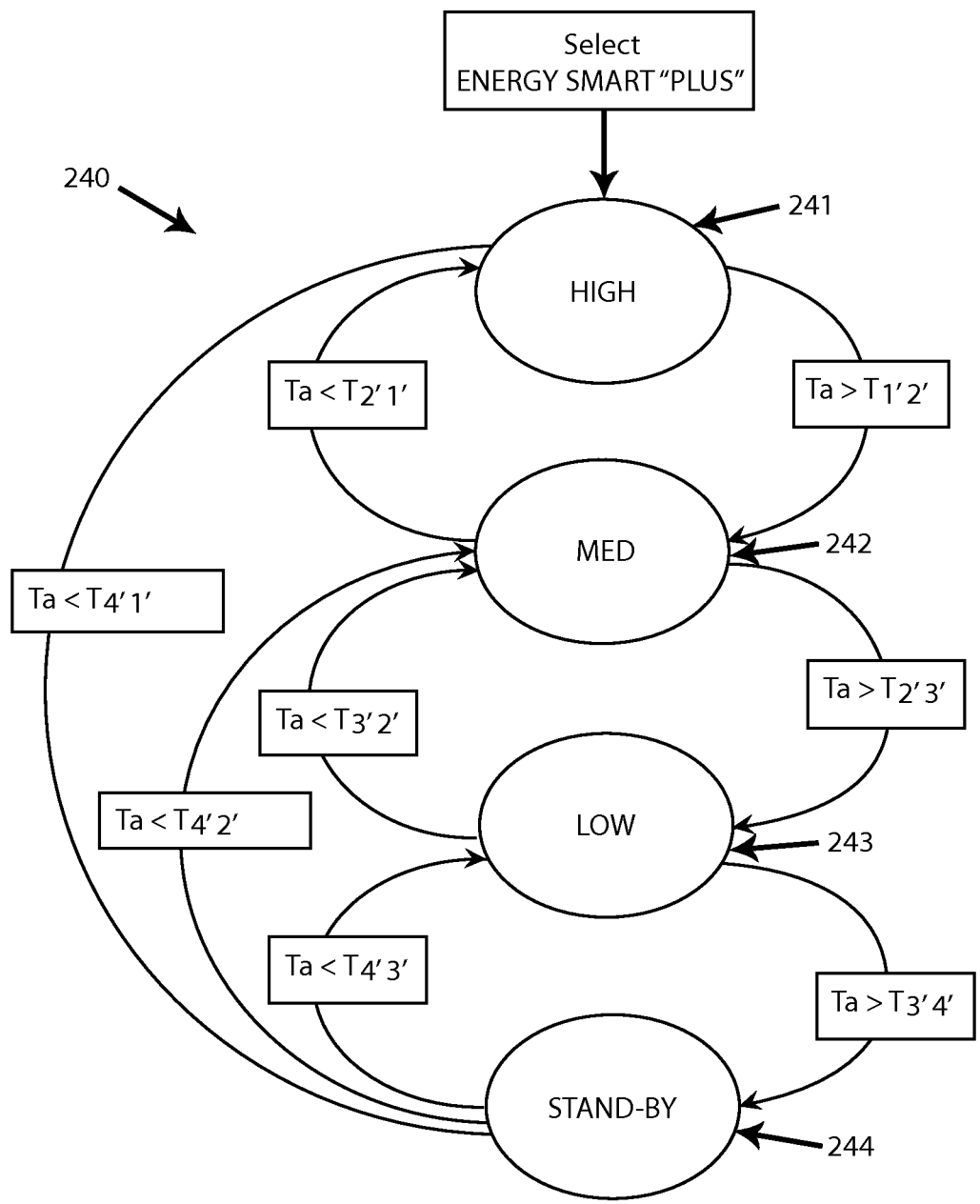
FIG. 3 is a flow chart of a heating method of a heater according to another embodiment of the present invention.

Referring to FIG. 3, the operations of another embodiment of a heater of the present invention having a state machine 240 including four control states (241, 242, 243, and 244) is illustrated. This embodiment can be considered as a modification of the embodiment as described above and depicted in FIG. 1 and FIG. 2, in that a fourth control state is included in the finite state machine, and being in or entering into such fourth control state will generate a control signal 131 to cause the heater to operate at a power state having a power level between that of the high-power state and that of the low-power state. In this embodiment, the transition threshold temperatures can include $T_{1'2'}$, $T_{2'1'}$, $T_{2'3'}$, $T_{3'2'}$, $T_{3'4'}$, and $T_{4'3'}$, the comparison of which with the measured ambient temperature can be used as conditions to determine the transitions amongst different control states, as shown schematically in FIG. 3.

As a further illustration, three exemplary sets of transition threshold temperatures and Ts of such a four-state heater are provided in Table 2 below.

TABLE 2

Exemplary values of Ts and transition threshold temperatures for a four-state heater as illustrated in FIG. 3

|  | Example 3 | Example 4 | Example 5 |
|---|---|---|---|
| Ts | 70° F. | 70° F. | 70° F. |
| $T_{1'2'}$ | 67° F. (=Ts − 3° F.) | 68.5° F. (=Ts − 1.5° F.) | 69° F. (=Ts − 1° F.) |
| $T_{2'1'}$ | 65° F. (=Ts − 5° F.) | 67.5° F. (=Ts − 2.5° F.) | 67° F. (=Ts − 3° F.) |
| $T_{2'3'}$ | 69° F. (=Ts − 1° F.) | 69.5° F. (=Ts − 0.5° F.) | 71° F. (=Ts + 1° F.) |
| $T_{3'2'}$ | 67° F. (=Ts − 3° F.) | 68.5° F. (=Ts − 1.5° F.) | 69° F. (=Ts − 1° F.) |
| $T_{3'4'}$ | 71° F. (=Ts + 1° F.) | 70.5° F. (=Ts + 0.5° F.) | 73° F. (=Ts + 3° F.) |
| $T_{4'3'}$ | 69° F. (=Ts − 1° F.) | 69.5° F. (=Ts − 0.5° F.) | 71° F. (=Ts + 1° F.) |

Additional transitions between control states that correspond to non-adjacent power levels) can also be implemented by employing conditions. Although the end result obtained from a single non-adjacent transitions can be accomplished by a series of cascading transitions between successive adjacent control states, such cascading transitions can take place with delay due to the lag in ambient temperature detection or non-continuous sampling of the ambient temperature which is needed to cause each successive transition to an adjacent state. In contrast, direct transitions between non-adjacent power states can result in a more rapid recovery towards the set temperature when the ambient temperature has a sudden and large change. For example, as illustrated in FIG. 3, a direct transition from the stand-by state to the high power state, and a direct transition from the stand-by state to the medium power state are included. Such non-adjacent transitions can be similarly based on predetermined transition threshold temperatures $T_{4'2'}$ and $T_{4'1'}$. For example, the transition threshold temperatures can be selected such that $T_{4'1'}<T_{4'2'}<T_{4'3'}$. As illustrated in FIG. 3, when a temperature drop occurs while the heater is in the stand-by state, the ambient temperature as detected by the temperature sensor can be compared with each of the transition threshold temperatures $T_{4'3'}$, $T_{4'2'}$, and $T_{4'1'}$, and a transition can be selected to move the heater to one of the high power, medium power, or low power states depending on where the ambient temperature falls relative to the three transition threshold temperatures. In one embodiment, if the ambient temperature falls below each of two or more transition threshold temperatures, a transition that moves the heater to the power state corresponding to the lowest transition threshold temperature can be selected. For example, and as shown in FIG. 3, if the ambient temperature falls between $T_{4'2'}$ and $T_{4'1'}$, the heater can transition from the stand-by state to the medium power state. If the ambient temperature detected falls below each of $T_{4'3'}$, $T_{4'2'}$, and $T_{4'1'}$, then the transition from the stand-by state to the high power state can be selected. In some embodiments, the transition threshold temperature of a non-adjacent transition can be set equal to the transition threshold temperature of a corresponding adjacent transition having the same destination state. For example, $T_{4'2'}$ and $T_{4'1'}$ as shown in FIG. 3 can be set equal to $T_{3'2'}$ and $T_{2'1'}$, respectively. Exemplary values of $T_{4'2'}$ and $T_{4'1'}$ for Example 5 (shown in Table 2) can be 69° F. and 67° F., respectively. In other embodiments, the heater can be configured to permit a user to select transitions as desired. In such a case, the user can be allowed, e.g., through a user interface of the heater as described herein, to specify or "program" the transition schemes of the heater that are different from the scheme as shown in FIG. 3. For example, instead of the heater automatically transitioning from the stand-by state to the high power state when the ambient temperature drops below each of transition threshold temperatures $T_{4'3'}$, $T_{4'2'}$, and $T_{4'1'}$, the user interface can enable the user to specify an alternative transition for such a scenario, e.g., transitioning from the stand-by state to the medium power state. Accordingly, the control circuitry of the heater is configured to recognize such a user-specified condition and make the transition as intended by the user. Further, the control circuitry of the heater can be configured to provide a default transition scheme (regardless of whether the associated transition threshold temperatures or differential temperatures are preset in the control circuitry or entered by the user), and additionally allow the user to selectively override the conditions or criteria of certain transitions, if desired.

Based on the transition scheme shown in FIG. 3 (including non-adjacent transitions) and values provided in Example 5 in Table 2, a sample schematic curve for an ambient temperature profile during a period of time of heating by a heater according to an embodiment depicted in FIG. 3 is shown in FIG. 4a, whereas the energy states (or power levels) of the heater for the corresponding segments of the curve in FIG. 4a are shown in FIG. 4b.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:
1. A heater comprising:
a heating unit for generating thermal energy, the heating unit capable of operating at a first power state in which the heater is capable of operating at a first power level, a second power state in which the heater is capable of operating at a second power level that is lower than the first power level, and a third power state in which the heater is capable of operating at a third power level that is lower than the second power level, the heating unit configured to enter the first, second and third power states according to a control signal;

a temperature sensor for measuring an ambient temperature of an environment capable of being heated by the heater and generating a corresponding temperature signal; and control circuitry for generating the control signal according to at least the temperature signal, the control circuitry configured to provide a finite state machine having at least a first control state, a second control state and a third control state, transitions between the control states determined according to at least the temperature signal and one or more user-selectable temperatures;

wherein when in the first control state or transitioning to the first control state the control circuitry generates the control signal to cause the heating unit to enter into the first power state, when in the second control state or transitioning to the second control state the control circuitry generates the control signal to cause the heating unit to enter into the second power state, and when in the third control state or transitioning to the third control state the control circuitry generates the control signal to cause the heating unit to enter into the third power state; and wherein the finite state machine is configured to:

transition from the first control state to the second control state when a temperature indicated by the temperature signal is above a first predetermined threshold temperature for transitioning from the first control state to the second control state;

transition from the second control state to the first control state when a temperature indicated by the temperature signal is below a second predetermined threshold temperature for transitioning from the second control state to the first control state, the first predetermined threshold temperature being different from the second predetermined threshold temperature;

transition from the second control state to the third control state when a temperature indicated by the temperature signal is above a third predetermined threshold temperature for transitioning from the second control state to the third control state; and transition from the third control state to the second control state when a temperature indicated by the temperature signal is below a fourth predetermined threshold temperature for transitioning from the third control state to the second control state, the third predetermined threshold temperature being different from the fourth predetermined threshold temperature.

2. The heater of claim 1, wherein the control circuitry further comprises a memory for storing one or more of the first, second, third and fourth predetermined threshold temperatures.

3. The heater of claim 1, further comprising a user interface configured to enable a user to enter one or more of the first, second, third and fourth predetermined threshold temperatures.

4. The heater of claim 1, further comprising a user interface configured to enable a user to enter a set temperature.

5. The heater of claim 4, wherein the user interface is further configured to enable the user to enter one or more differential temperatures relative to the set temperature, and wherein the control circuitry is further configured to compute the first, second, third and fourth threshold temperatures based on the entered one or more differential temperatures and the set temperature.

6. The heater of claim 4, wherein the circuitry is further configured to automatically generate the first, second, third and fourth predetermined threshold temperatures based on the set temperature.

7. The heater of claim 1, wherein the third power state is a stand-by state.

8. The heater of claim 1, wherein the finite state machine is further configured to directly transition from the third control state to the first control state when a temperature indicated by the temperature signal is below the first predetermined threshold temperature.

9. The heater of claim 1, wherein a predetermined threshold temperature for transitioning from the third control state to the first control state is selected to be the same as the second predetermined threshold temperature.

10. The heater of claim 1, further comprising a user interface configured to enable a user to specify a destination control state to which the finite state machine transitions from the third control state under a condition when a temperature indicated by the temperature signal falls below the first predetermined threshold temperature and a predetermined threshold temperature for transitioning from the third control state to the first control state, the finite state machine further configured to transition from the third control state to the destination state specified by the user under the condition.

11. The heater of claim 1, further supporting a fourth power state in which the heater is capable of operating at a fourth power level that is lower than the third power level, wherein the finite state machine is further configured to:

transition from the third control state to the fourth control state when a temperature indicated by the temperature signal is above a fifth predetermined threshold temperature for transitioning from the third control state to the fourth control state; and transition from the fourth control state to the third control state when a temperature indicated by the temperature signal is below a sixth predetermined threshold temperature for transitioning from the fourth control state to the third control state, the fifth predetermined threshold temperature being different from the sixth predetermined threshold temperature.

12. The heater of claim 11, wherein the fourth power state is a stand-by state.

13. The heater of claim 1 wherein the first predetermined threshold temperature is greater than the second predetermined threshold temperature, and the third predetermined threshold temperature is greater than the fourth predetermined threshold temperature.

14. The heater of claim 11 wherein the fifth predetermined threshold temperature is greater than the sixth predetermined threshold temperature.

15. A heater comprising:

a heating unit for generating thermal energy, the heating unit capable of operating at a first power state in which the heater capable of operating at a first power level, a second power state in which the heater capable of operating at a second power level that is lower than the first power level, and a third power state in which the heater capable of operating at a third power level that is lower than the second power level, the heating unit configured to enter the first, second and third power states according to a control signal;

a temperature sensor for measuring an ambient temperature of an environment capable of being heated by the heater and generating a corresponding temperature signal; and control circuitry for generating the control signal according to at least the temperature signal and one or more user-selectable temperatures, the control circuitry comprising a central processing unit communicatively coupled to a memory, the memory storing program code executable by the central processing unit to perform steps comprising:

generating the control signal to cause the heating unit to enter into the first power state from the second power state when an ambient temperature is below a first predetermined threshold temperature for transitioning from the second power state to the first power state;

generating the control signal to cause the heating unit to enter into the second power state from the first power state when the ambient temperature is above a second predetermined threshold temperature for transitioning from the first power state to the second power state, the first predetermined threshold temperature being different from the second predetermined threshold temperature;

generating the control signal to cause the heating unit to enter into the second power state from the third power state when the ambient temperature is below a third predetermined threshold temperature for transitioning from the third power state to the second power state; and generating the control signal to cause the heating unit to enter into the third power state from the second power state when the ambient temperature is above a fourth predetermined threshold temperature for transitioning from the second power state to the third power state, the third predetermined threshold temperature being different from the fourth predetermined threshold temperature.

16. The heater of claim 15, wherein the steps further comprise: generating the control signal to cause the heating unit to enter into the first power state from the third power state when the ambient temperature is below the second predetermined threshold temperature.

17. The heater of claim 15 wherein the first predetermined threshold temperature is less than the second predetermined threshold temperature, and the third predetermined threshold temperature is less than the fourth predetermined threshold temperature.

18. A control circuit for a heating unit, comprising:

mode control circuitry for generating a power control signal to control the heating unit according to one or more user-selectable temperatures and a temperature signal received from a temperature sensor measuring ambient temperature of an environment capable of being heated by the heating unit, the mode control circuitry comprising a central processing unit communicatively coupled to a memory, the memory storing program code executable by the central processing unit to perform steps comprising:

generating the power control signal to cause the heating unit to enter into a low-power state from a high-power state when the ambient temperature indicated by the temperature signal is above a first predetermined threshold temperature for transitioning from the high-power state to the low-power state;

generating the power control signal to cause the heating unit to enter into the high-power state from the low-power state when the ambient temperature indicated by the temperature signal is below a second predetermined threshold temperature for transitioning from the low-power state to the high-power state, the first predetermined threshold temperature being different from the second predetermined threshold temperature;

generating the power control signal to cause the heating unit to enter into a stand-by state from the low-power state when the ambient temperature indicated by the temperature signal is above a third predetermined threshold temperature for transitioning from the low-power state to the stand-by state; and generating the power control signal to cause the heating unit to enter into the low-power state from the stand-by state when the ambient temperature indicated by the temperature signal is below a fourth predetermined threshold temperature for transitioning from the stand-by state to the low-power state, the third predetermined threshold temperature being different from the fourth predetermined threshold temperature.

19. The control circuit of claim 18 wherein the first predetermined threshold temperature is greater than the second predetermined threshold temperature, and the third predetermined threshold temperature is greater than the fourth predetermined threshold temperature.

20. A control device for a heating unit, the heating unit capable of generating thermal energy and capable of supporting at least a first power state in which the heater is capable of operating at a first power level, a second power state in which the heater is capable of operating at a second power level that is lower than the first power level, and a third power state in which the heater is capable of operating at a third power level that is lower than the second power level, the heating unit configured to enter the first, second and third power states according to a control signal, the control device comprising:

control circuitry for generating the control signal according to at least a temperature signal corresponding to a temperature of an environment capable of being heated by the heating unit, the control circuitry configured to provide a finite state machine having at least a first control state, a second control state and a third control state, transitions between the control states determined according to at least the temperature signal and one or more user-selectable temperatures;

wherein when in the first control state or transitioning to the first control state the control circuitry generates the control signal to cause the heating unit to enter into the first power state, when in the second control state or transitioning to the second control state the control circuitry generates the control signal to cause the heating unit to enter into the second power state, and when in the third control state or transitioning to the third control state the control circuitry generates the control signal to cause the heating unit to enter into the third power state: and wherein the control circuitry is further configured to:

transition from the first control state to the second control state when a temperature indicated by the temperature signal is above a first predetermined threshold temperature for transitioning from the first control state to the second control state;

transition from the second control state to the first control state when a temperature indicated by the temperature signal is below a second predetermined threshold temperature for transitioning from the second control state to the first control state, the first predetermined threshold temperature being different from the second predetermined threshold temperature;

transition from the second control state to the third control state when a temperature indicated by the temperature signal is above a third predetermined threshold temperature for transitioning from the second control state to the third control state; and transition from the third control state to the second control state when a temperature indicated by the temperature signal is below a fourth predetermined threshold temperature for transitioning from the third control state to the second control state, the third predetermined threshold temperature being different from the fourth predetermined threshold temperature.

21. The control device of claim 20 wherein the first predetermined threshold temperature is greater than the second predetermined threshold temperature, and the third predetermined threshold temperature is greater than the fourth predetermined threshold temperature.

* * * * *